(12) United States Patent
Falco, Jr. et al.

(10) Patent No.: US 10,130,090 B1
(45) Date of Patent: Nov. 20, 2018

(54) INSECT TRAP OR BAIT STATION APPARATUS AND METHOD

(71) Applicants: Frank Falco, Jr., Staten Island, NY (US); Renzo Capraro, Marlboro, NJ (US)

(72) Inventors: Frank Falco, Jr., Staten Island, NY (US); Renzo Capraro, Marlboro, NJ (US)

( * ) Notice: Subject to any disclaimer, the term of this patent is extended or adjusted under 35 U.S.C. 154(b) by 0 days.

(21) Appl. No.: 15/986,897

(22) Filed: May 23, 2018

(51) Int. Cl.
*A01M 1/02* (2006.01)
*A01M 1/20* (2006.01)

(52) U.S. Cl.
CPC ............ *A01M 1/2005* (2013.01); *A01M 1/02* (2013.01)

(58) Field of Classification Search
CPC .... A01M 1/2005; A01M 1/02; A01M 25/002; A01M 25/004; A01M 25/00; B65D 2517/0022; B65D 1/1616
USPC ................ 220/730, 370, 372, 676; 206/499; 43/131
See application file for complete search history.

(56) References Cited

U.S. PATENT DOCUMENTS

| | | | | | |
|---|---|---|---|---|---|
| 1,715,173 | A | * | 5/1929 | Opitz | A01M 1/02 43/121 |
| 1,804,891 | A | * | 5/1931 | Newman | A01M 1/2005 43/131 |
| 1,820,186 | A | * | 8/1931 | Gaskins | A01M 25/004 43/131 |
| 2,009,305 | A | * | 7/1935 | Vinson | A01M 1/2055 43/131 |
| 2,291,358 | A | * | 7/1942 | Treadwell | A01K 97/04 43/131 |
| 3,303,600 | A | * | 2/1967 | Freeman | A01M 25/004 119/63 |
| 4,143,764 | A | * | 3/1979 | Moss, III | B65D 25/04 206/429 |
| 4,395,842 | A | * | 8/1983 | Margulies | A01M 1/02 43/114 |
| 8,978,291 | B1 | * | 3/2015 | Cambre | A01M 25/004 220/844 |
| 2002/0069579 | A1 | * | 6/2002 | Hyatt | A01M 1/2011 43/131 |
| 2006/0006183 | A1 | * | 1/2006 | Yeh | H01L 21/67356 220/676 |

FOREIGN PATENT DOCUMENTS

WO    WO-9622684 A1 *  8/1996 ............. A01M 1/02

* cited by examiner

*Primary Examiner* — Magdalena Topolski
(74) *Attorney, Agent, or Firm* — Walter J. Tencza, Jr.

(57) ABSTRACT

A holder including first, second, third, and fourth sides, a top, and a bottom. The first side is fixed to the second side; the second side is fixed to the third side; the third side is fixed to the fourth side, which is fixed to the first side; the first and third sides are parallel and spaced apart; the second and fourth sides are parallel and spaced apart, and perpendicular to the first and third sides; and the top and the bottom are parallel and spaced apart and perpendicular to and fixed to the first, second, third, and fourth sides. Each of the first, second, and third sides has an opening leading to an inner chamber which is delimited by the first, second, third, and fourth sides, and the top and bottom; the fourth side has an opening leading to the inner chamber for insertion of an insect trap and/or bait station.

12 Claims, 5 Drawing Sheets

INSECT TRAP OR BAIT STATION APPARATUS AND METHOD

FIELD OF THE INVENTION

This invention relates to insect traps and/or insect bait stations.

BACKGROUND OF THE INVENTION

There are various known devices and methods related to insect traps and/or insect bait stations.

SUMMARY OF THE INVENTION

In at least one embodiment of the present invention, an apparatus is provided comprising a housing including: a first side; a second side; a third side; a fourth side; a top; and a bottom.

In at least one embodiment of the present invention the first side is fixed to the second side; the second side is fixed to the third side; the third side is fixed to the fourth side, which is fixed to the first side; the first and third sides are parallel and spaced apart; the second and fourth sides are parallel and spaced apart, and perpendicular to the first and third sides; and the top and the bottom are parallel and spaced apart and perpendicular to and fixed to the first, second, third, and fourth sides.

Each of the first, second, and third sides has an opening leading to an inner chamber which is delimited by the first, second, third, and fourth sides, and the top and the bottom; wherein the fourth side has an opening leading to the inner chamber; wherein the opening of the fourth side is larger than the openings of the first, second, and third sides; wherein each of the first, second, and third sides have a flange which protrudes from the bottom; wherein the fourth side does not have a flange which protrudes from the bottom; and wherein the opening of the fourth side, and the openings of the first, second, and third sides are configured to allow an insect trap and/or insect bait station to slide in through the opening of the fourth side, while in contact with the bottom, and while in contact with the bottom, the flanges of the first, second, and third sides prevent the insect trap and/or bait station from sliding out of the inner chamber.

In accordance with at least one embodiment of the present invention, an insect bait station may be considered to be a form of an insect trap, even though insects may take bait and leave an insect bait station, and go back to an insect colony and infect other insects.

In at least one embodiment of the present invention at least one protrusion protrudes from the top, and is configured to press down on the insect trap and/or bait station, as it slides into the inner chamber.

The apparatus may include the insect trap and/or bait station, wherein the width, height, and/or general size of the opening of the fourth side, and of the inner chamber is configured to snugly fit the insect trap and/or bait station.

In at least one embodiment, each of the first, second, and third sides has a flange which protrudes from the top; and the fourth side does not have a flange which protrudes from the top at the location of the opening of the fourth side.

At least one embodiment, provides a method which includes inserting an insect trap and/or bait station into a holder or housing; wherein the holder or housing may be as previously described.

DETAILED DESCRIPTION OF THE DRAWINGS

Figure 1:
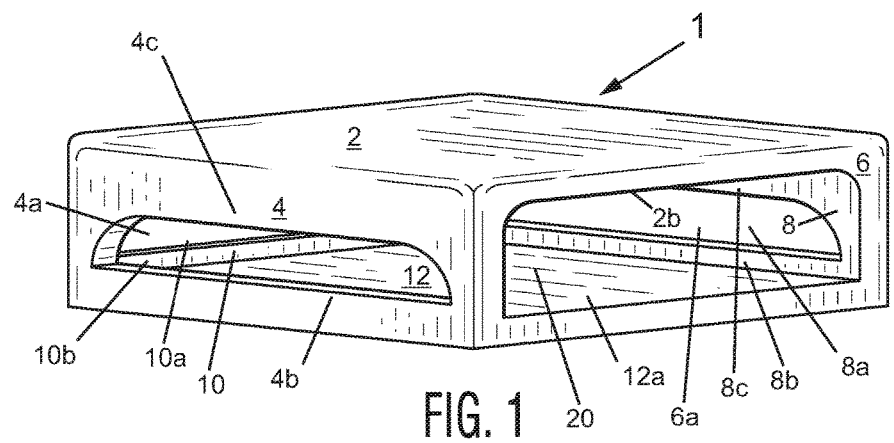
FIG. 1 shows a front, top, and left side perspective view of an apparatus in accordance with an embodiment of the present invention.
Figure 2:
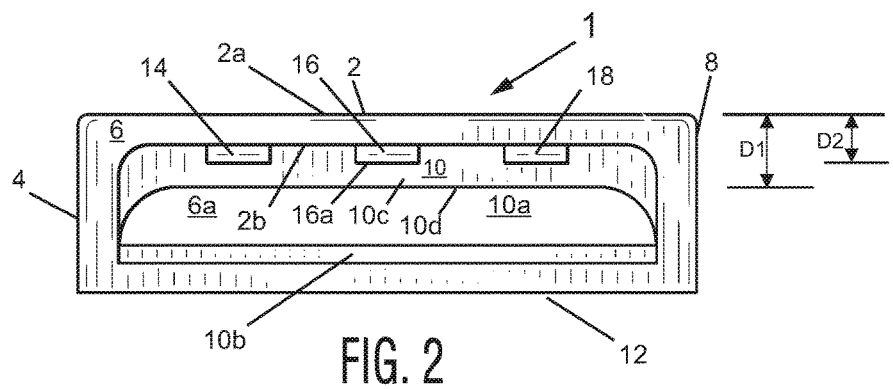
FIG. 2 shows a front elevational view of the apparatus of FIG. 1.
Figure 3:
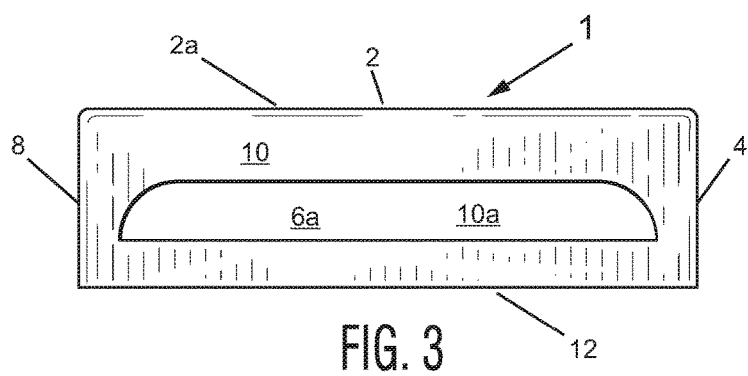
FIG. 3 shows a rear elevational view of the apparatus of FIG. 1.
Figure 4:
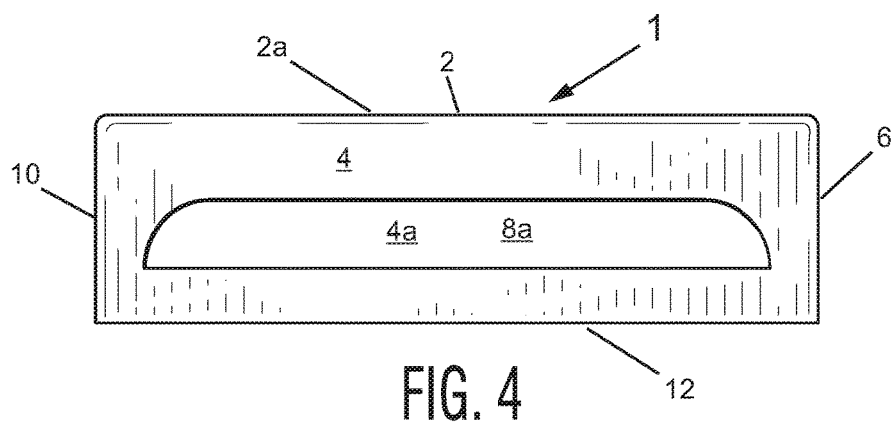
FIG. 4 shows a left side elevational view of the apparatus of FIG. 1.
Figure 5:
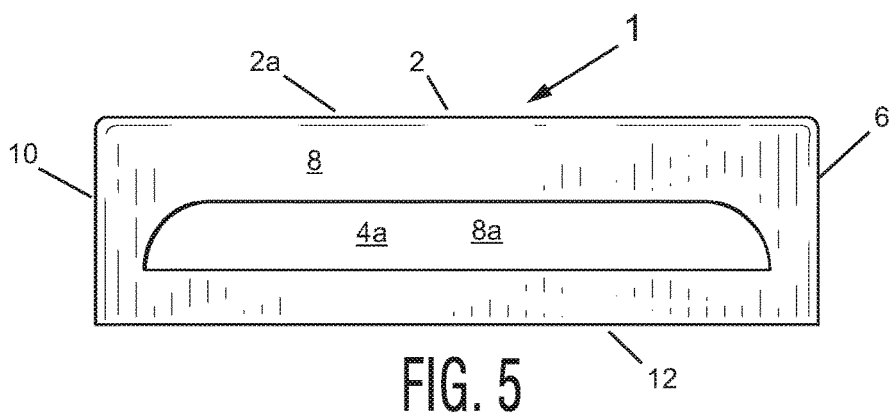
FIG. 5 shows a right side elevational view of the apparatus of FIG. 1.
Figure 6:
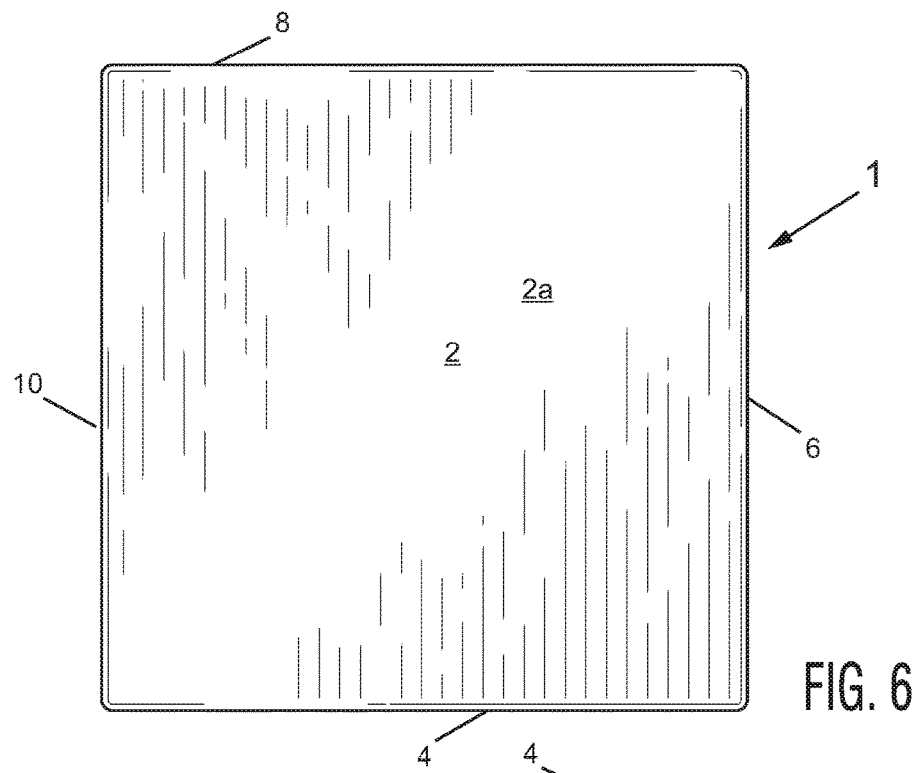
FIG. 6 shows a top elevational view of the apparatus of FIG. 1.
Figure 7:
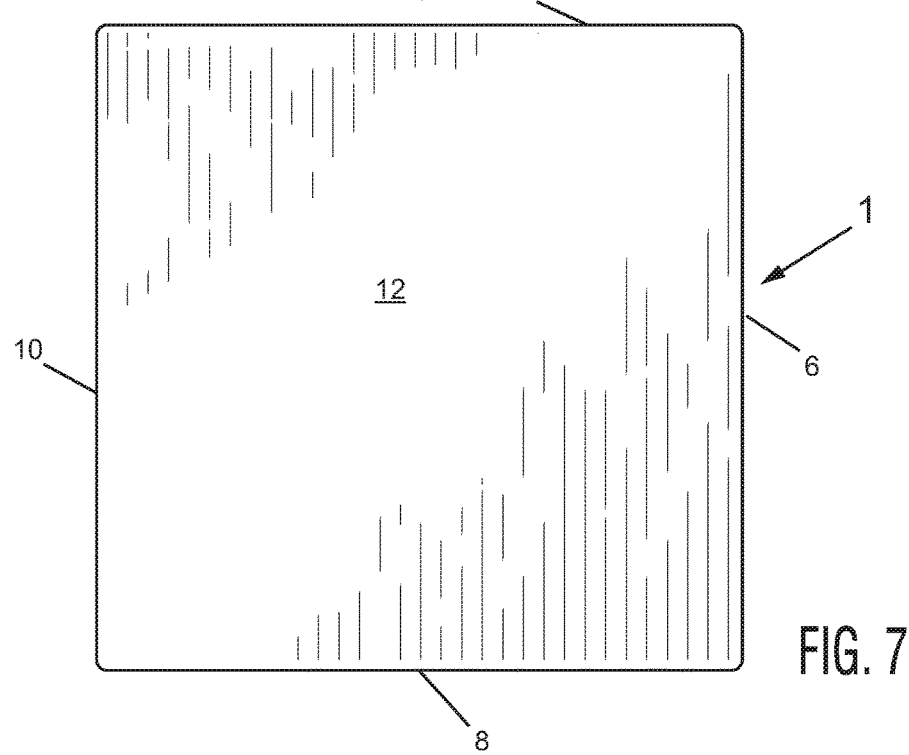
FIG. 7 shows a bottom elevational view of the apparatus of FIG. 1.
Figure 8:
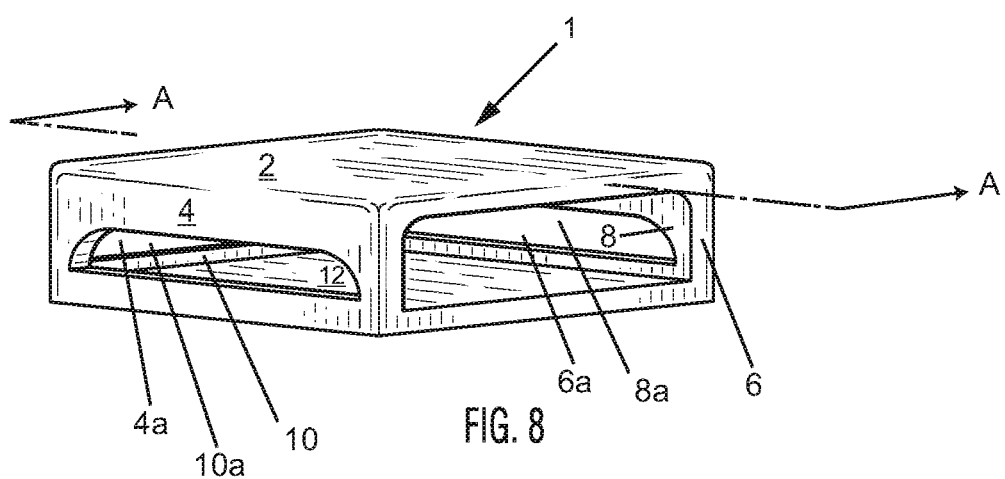
FIG. 8 shows the front, top, and left side perspective view FIG. 1, along with line AA showing where a sectional view is taken for FIG. 9.
Figure 9:
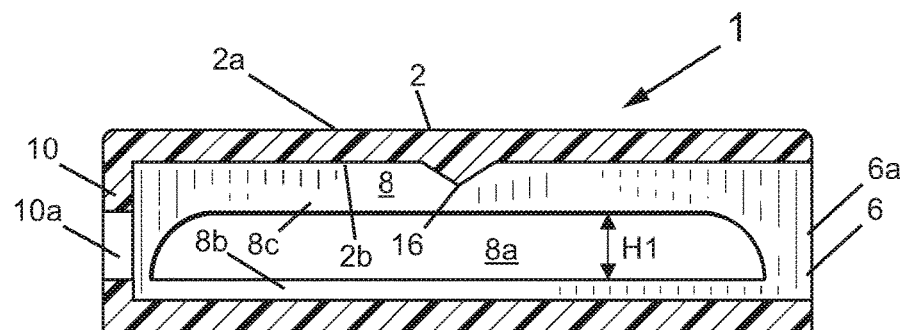
FIG. 9 shows a sectional view of the apparatus of FIG. 1, taken along the line AA shown by FIG. 8.
Figure 10:
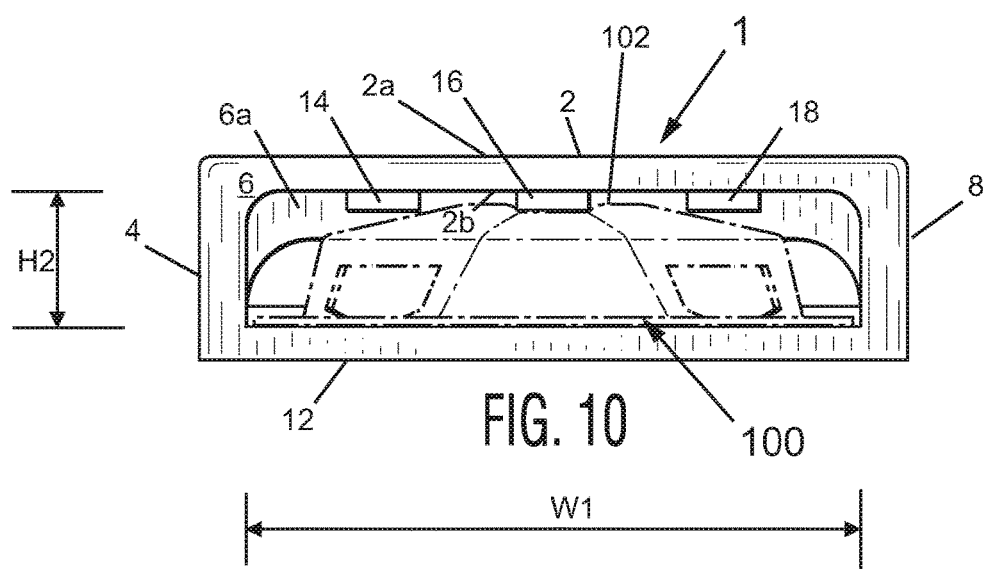
FIG. 10 shows the front elevational view of the apparatus of FIG. 1, along with an insect trap and/or bait station inserted into the apparatus of FIG. 1.

FIG. 1 shows a front, top, and left side perspective view of an apparatus 1 in accordance with an embodiment of the present invention. FIG. 2 shows a front elevational view of the apparatus 1. FIG. 3 shows a rear elevational view of the apparatus 1. FIG. 4 shows a left side elevational view of the apparatus 1. FIG. 5 shows a right side elevational view of the apparatus 1. FIG. 6 shows a top elevational view of the apparatus 1. FIG. 7 shows a bottom elevational view of the apparatus 1. FIG. 8 shows the front, top, and left side perspective view of FIG. 1, along with line AA showing where a sectional view is taken for FIG. 9. FIG. 9 shows a sectional view of the apparatus 1, taken along the line AA shown by FIG. 8. FIG. 10 shows a front elevational view of the apparatus 1, along with an insect trap 100 inserted into the apparatus 1.

The apparatus 1 may also be called a housing or a holder. The combination of the housing or apparatus 1 and the insect trap 100, may be called an overall apparatus.

Referring to FIGS. 1-10, the apparatus 1 may include a top 2, sides 4, 6, 8, and 10, and a bottom 12. The top 2 may have a top surface 2a and a bottom surface 2b shown in FIG. 2. The sides 4, 6, 8, and 10 may have openings 4a, 6a, 8a, and 10a, respectively. The openings 4a, 8a, and 10a may be identical in size and shape or substantially similar. Generally, it is critical, in at least one embodiment, that the opening 6a be larger than the openings 4a, 8a, and 10a, so that a top edge of the opening 6a coincides with the bottom surface 2b, and a bottom edge of the opening 6a coincides with a top surface 12a of the bottom 12. Generally, it is critical in at least one embodiment, that the sides 4, 8, and 10 include lower flanges or protrusions 4b, 8b, and 10b, respectively, that extend beyond the top surface 12a of the bottom 12, towards the top 2, as shown by the combination of FIGS. 1 and 2. Generally, it is critical, in at least one embodiment that the sides 4, 8, and 10 include top flanges or protrusions 4c, 8c, and 10c, respectively, that extend beyond the bottom surface 2b of the top 2, towards the bottom 12, as shown by the combination of FIGS. 1 and 2. It is critical, in at least one embodiment, that each of upper flanges 4c, 8c, and 10c may have a height D1 shown in FIG. 2, which is greater than the thickness of the top 2, and greater than D2, which is the combination of the thickness of the top 2 and the thickness of each of the protrusions 14, 16, and 18.

The upper flanges 4c, 8c, and 10c, and the lower flanges 4b, 8b, and 10c, are provided so that a conventional known insect trap, such as insect trap and/or bait station 100 shown by dashed lines in FIG. 10, can be inserted into an inner chamber 20 of the apparatus 1 shown in FIG. 1, and will not fall out through openings 4a, 10a, or 8a, and is also largely hidden from view by upper flanges 4c, 8c, 10c, and lower flanges 4b, 8b, and 10c. The opening 6a, through which the trap 100 is inserted may have a height H2, and a width W1 shown in FIG. 10, which may be approximately the overall or maximum height and width of the trap and/or bait station 100 or slightly greater or slightly less if the trap is elastic, so that a snug fit is provided. A height H1 of the openings 4a, 8a, and 10a, shown in FIG. 9, is substantially less than the height H2 due to lower flanges, such as 8b and upper flanges, such as 8c, shown in FIG. 9, to prevent the trap and/or bait station 100 from falling out of the inner chamber 20 of the apparatus 1, and to make the trap 100 be substantially hidden from view. Note that the trap and/or bait station 100, in at least one embodiment, may not be entirely hidden from view to allow insects to come into the trap and/or bait station 100 through any of the openings 4a, 6a, 8a, or 10a.

In at least one embodiment, the protrusions 14, 16, and 18 are integrated with and/or protrude from the bottom surface 2b of the top 2, and are used to compress the trap 100 or at least a portion of the upper surface 102 of the trap and/or bait station 100 to hold the trap and/or bait station 100 in place and prevent the trap from falling out of the opening 6a, as shown by FIG. 10.

The apparatus 1 may be single integrated unit which is molded from plastic, or which is formed from plastic or some other material from a three dimensional printer, for example.

The bottom 12 can be mounted to a wall with the bottom 12 against the wall and parallel or substantially parallel to the wall, to mount the apparatus 1 to a wall, near the bottom of the wall, to make the apparatus 1 appear to be a known electrical, cable, phone, or internet housing, in order to disguise the fact that the apparatus 1 holds insect trap 100. A person would largely see the top 2 as seen in FIG. 6, when the bottom 12 is mounted to a wall, against the wall, and parallel to the wall.

In at least one embodiment, the apparatus 1 may be a holder for certain ant and roach or insect bait stations (insect traps) that may attach to a wall, floor or baseboard, under counter or in plain sight with adhesive tape of some kind, screws, nails, fasteners, or any other logical means of attaching the apparatus 1 to a surface, and conceals the bait stations and keeps them safe and secure from pets and children and out of plain sight.

The apparatus 1 may look similar to a phone wall jack from a distance and may make the known bait station or trap 100 inconspicuous. In at least one embodiment, the apparatus 1, may have three partially open or smaller opening sides (openings 4a, 8a, and 10a of sides 4, 8, and 10, respectively) and one side that has a substantially larger opening 6a of side 6, enough for most bait stations on the market to slide into the apparatus 1 and stay in place, inside of the apparatus 1.

A bait station or trap such as 100 may be held in place by small divots or protrusions, such as 14, 16, and 18 inside the apparatus 1 that put slight pressure on the top of the bait station or trap 100 when the station or trap 100 slides into the inner chamber 20 keeping the bait station or trap 100 secure, so it does not move inside the apparatus 1 when the apparatus 1 is held in different orientations or placed vertically, with bottom 12 parallel and against a vertical wall. The apparatus 1 may be universal for a number types of bait stations or traps. The divots or protrusions, such as 14, 16, and 18 may be moved, changed in size and repositioned to hold different types of traps or stations. The apparatus 1 is used, in at least one embodiment, for safety and esthetic purposes. The shape and size of the apparatus 1 may be changed and may slightly vary in order to accommodate different size bait stations. It may be used indoors and outdoors.

In at least one embodiment of the present invention, an insect bait station is considered to be an insect trap, or form of an insect trap, even though insects may enter the bait station, and leave the bait station, taking the bait back to an insect colony, for example, and/or infecting the insect colony.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus comprising:
   a housing; and
   an insect bait station containing therein bait prior to insertion of the insect bait station into the housing;
   the housing including:
      a first side;
      a second side;
      a third side;
      a fourth side;
      a top;
      a bottom;
   wherein the first side is fixed to the second side;
   wherein the second side is fixed to the third side;
   wherein the third side is fixed to the fourth side, which is fixed to the first side;
   wherein the first and third sides are parallel and spaced apart;
   wherein the second and fourth sides are parallel and spaced apart, and perpendicular to the first and third sides;
   wherein the top and the bottom are parallel and spaced apart and perpendicular to and fixed to the first, second, third, and fourth sides;
   wherein each of the first, second, and third sides has an opening leading to an inner chamber, wherein the inner chamber is delimited by the first, second, third, and fourth sides, and the top and the bottom;
   wherein the fourth side has an opening leading to the inner chamber;
   wherein the opening of the fourth side is larger than the openings of the first, second, and third sides;
   wherein each of the first, second, and third sides have a flange which protrudes from the bottom;
   wherein the fourth side does not have a flange which protrudes from the bottom;
   wherein the opening of the fourth side, and the openings of the first, second, and third sides are configured to allow the insect bait station to slide in through the opening of the fourth side, while in contact with the bottom, and while in contact with the bottom, the flanges of the first, second, and third sides prevent the insect bait station from sliding out of the inner chamber; and wherein the bait is configured in the insect bait station, so that insects can enter the insect bait station while the insect bait station is in the inner chamber of the housing, take the bait from the insect bait station, and leave the insect bait station.

2. The apparatus of claim 1 wherein at least one protrusion protrudes from the top, and is configured to press down on the insect bait station, as it slides into the inner chamber.

3. The apparatus of claim 1 wherein the at least one protrusion is substantially centrally located with respect to the top and is configured to press down on a central portion of the insect bait station to keep the insect bait station from moving inside of the housing.

4. The apparatus of claim 3 wherein the housing is a single integrated molded plastic unit.

5. The apparatus of claim 1 wherein wherein each of the first, second, and third sides has a flange which protrudes from the top; and wherein the fourth side does not have a flange which protrudes from the top at the location of the opening of the fourth side.

6. The apparatus of claim 1 wherein the housing is a single integrated molded plastic unit.

7. A method comprising the steps of:

inserting an insect bait station into a housing;

wherein the insect bait station contains therein bait prior to insertion of the insect bait station into the housing;

wherein the housing includes a first side, a second side, a third side, a fourth side, a top, and a bottom;

wherein the first side is fixed to the second side;

wherein the second side is fixed to the third side;

wherein the third side is fixed to the fourth side, which is fixed to the first side;

wherein the first and third sides are parallel and spaced apart;

wherein the second and fourth sides are parallel and spaced apart, and perpendicular to the first and third sides;

wherein the top and the bottom are parallel and spaced apart and perpendicular to and fixed to the first, second, third, and fourth sides;

wherein each of the first, second, and third sides has an opening leading to an inner chamber wherein the inner chamber is delimited by the first, second, third, and fourth sides, and the top and the bottom;

wherein the fourth side has an opening leading to the inner chamber;

wherein the opening of the fourth side is larger than the openings of the first, second, and third sides;

wherein each of the first, second, and third sides have a flange which protrudes from the bottom;

wherein the fourth side does not have a flange which protrudes from the bottom;

wherein the opening of the fourth side, and the openings of the first, second, and third sides are configured to allow the insect bait station to slide in through the opening of the fourth side, while in contact with the bottom, and while in contact with the bottom, the flanges of the first, second, and third sides prevent the insect bait station from sliding out of the inner chamber; and wherein the insect bait station contains therein bait so that insects can enter the insect bait station while the insect bait station is in the inner chamber of the housing, take the bait from the insect bait station, and leave the insect bait station.

8. The method of claim 7 wherein at least one protrusion protrudes from the top, and is configured to press down on the insect bait station, as it slides into the inner chamber.

9. The method of claim 7 wherein the at least one protrusion is substantially centrally located with respect to the top and is configured to press down on a central portion of the insect bait station to keep the insect bait station from moving inside of the housing.

10. The method of claim 7 wherein the housing is a single integrated molded plastic unit.

11. The method of claim 7 wherein wherein each of the first, second, and third sides has a flange which protrudes from the top; and wherein the fourth side does not have a flange which protrudes from the top at the location of the opening of the fourth side.

12. The method of claim 7 wherein the housing is a single integrated molded plastic unit.

* * * * *